US012684324B2

(12) United States Patent  
Gajula et al.

(10) Patent No.: US 12,684,324 B2  
(45) Date of Patent: Jul. 14, 2026

(54) METHODS AND SYSTEMS FOR MANAGING MISSION CRITICAL DATA (MCDATA) SESSIONS

(71) Applicant: Samsung Electronics Co., Ltd., Suwon-si (KR)

(72) Inventors: Kiran Gajula, Bangalore (IN); Kiran Gurudev Kapale, Bangalore (IN); Siva Prasad Gundur, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 494 days.

(21) Appl. No.: 17/983,629

(22) Filed: Nov. 9, 2022

(65) Prior Publication Data

US 2023/0067571 A1    Mar. 2, 2023

Related U.S. Application Data

(63) Continuation of application No. PCT/KR2021/006358, filed on May 21, 2021.

(30) Foreign Application Priority Data

May 22, 2020    (IN) .............................. 202041021695  
May 14, 2021    (IN) ............................ 2020 41021695

(51) Int. Cl.  
*H04W 4/90*        (2018.01)  
*H04L 5/00*        (2006.01)  
*H04W 4/12*        (2009.01)  
(52) U.S. Cl.  
CPC ............. *H04W 4/90* (2018.02); *H04L 5/0044* (2013.01); *H04W 4/12* (2013.01)  
(58) Field of Classification Search  
CPC ......... H04W 4/90; H04W 4/14; H04W 28/04; H04W 72/1289; H04W 72/0466; H04L 1/0038

(Continued)

(56) References Cited

U.S. PATENT DOCUMENTS

2012/0106448 A1 *  5/2012  Yousefi .................. H04N 7/183  
                                                                370/328  
2018/0103364 A1     4/2018  Gholemieh et al.

(Continued)

FOREIGN PATENT DOCUMENTS

WO      2016/161599 A1    10/2016

OTHER PUBLICATIONS

Reeza Demonteverde et al., 'Collaboration between Multiple Unmanned Vehicles for Increased Mission Efficiency', AIAA Infotech@ Aerospace, Jan. 1, 2016.

(Continued)

*Primary Examiner* — Maria El-Zoobi  
(74) *Attorney, Agent, or Firm* — Jefferson IP Law, LLP

(57)            ABSTRACT

The disclosure relates to a communication method and system for converging a 5th-Generation (5G) communication system for supporting higher data rates beyond a 4th-Generation (4G) system with a technology for Internet of Things (IoT). A method is provided. The method includes transmitting by at least one sender, respective MCData User Identifier (ID) to at least one receiver User Equipment (UE), receiving, by the at least one receiver UE, the MCData User ID of the at least one sender UE, and decoding, by the at least one receiver UE, the received sender MCData User ID to identify the at least one sender UE, wherein the sender MCData User ID is included in one of a signaling payload message content and a MCData notification message sent by the at least one sender UE to the at least one receiver UE.

7 Claims, 16 Drawing Sheets

| Message Type | Data & Time | Conversation ID | Message ID | InReplyTo Message ID | Application ID |
|---|---|---|---|---|---|

(58) Field of Classification Search

USPC ..................................................... 455/404.1

See application file for complete search history.

(56) References Cited

U.S. PATENT DOCUMENTS

| | | | |
|---|---|---|---|
| 2018/0242118 A1 | 8/2018 | Belleschi et al. | |
| 2019/0289439 A1* | 9/2019 | Sangameshwara ... | H04W 28/04 |
| 2019/0387398 A1* | 12/2019 | Rajadurai ........... | H04W 12/106 |
| 2020/0045508 A1 | 2/2020 | Buckley et al. | |
| 2023/0067571 A1* | 3/2023 | Gajula .................... | H04W 4/90 |

OTHER PUBLICATIONS

3GPP TS 24.282 V16.4.0 (Jun. 2020) 3rd Generation Partnership Project; Technical Specification Group Core Network and Terminals; Mission Critical Data (MCData) signalling control; Protocol specification (Release 16), Jul. 9, 2020.

3GPP TS 24.282 V15.8.0 (Jun. 2020) 3rd Generation Partnership Project; Technical Specification Group Core Network and Terminals; Mission Critical Data (MCData) signalling control; Protocol specification (Release 15), Jul. 9, 2020.

3GPP TS 24.582 V16.1.0 (Jun. 2020) 3rd Generation Partnership Project; Technical Specification Group Core Network and Terminals; Mission Critical Data (MCData) media plane control; Protocol specification (Release 16), Jul. 9, 2020.

3GPP TS 24.582 V15.1.0 (Jun. 2020) 3rd Generation Partnership Project; Technical Specification Group Core Network and Terminals; Mission Critical Data (MCData) media plane control; Protocol specification (Release 15), Jul. 9, 2020.

3GPP TSG-CT WG1 Meeting #124-e C1-203915 Electronic meeting, Jun. 2-10, 2020, Adding mcdata id in signalling payload for sender of the data in MCData media plane (Session) communication, Jun. 8, 2020.

3GPP TSG-CT WG1 Meeting #124-e C1-203917 Electronic meeting, Jun. 2-10, 2020, Adding mcdata id in signalling payload for sender of the data in MCData media plane (Session) communication, Jun. 8, 2020.

Indian Office Action dated Jul. 11, 2023, issued in Indian Application No. 202041021695.

* cited by examiner

FIG. 1

| Message Type | Data & Time | Conversation ID | Message ID | InReplyTo Message ID | Application ID |
|---|---|---|---|---|---|

FIG. 7A

SDS signalling payload message content

| IEI | Information Element | Type/Reference | Presence | Format | Length |
|-----|---------------------|----------------|----------|--------|--------|
|  | SDS signalling payload message identity | message type 15.2.2 | M | V | 1 |
|  | Data and time | Data and time 15.2.8 | M | V | 5 |
|  | Conversation ID | Conversation ID 15.2.9 | M | V | 16 |
|  | Message ID | Message ID 15.2.10 | M | V | 16 |
| 21 | InReply To message ID | InReply To message ID 15.2.11 | O | TV | 17 |
| 22 | Application ID | Application ID 15.2.7 | O | TV | 2 |
| 8- | SDS disposition request type | SDS disposition request type 15.2.3 | O | TV | 1 |
| 70 | Extended Application ID | Extended Application ID 15.2.24 | O | TLV-E | 3-x |
| 51 | Sender MCData user ID | MCData user ID 15.2.15 | O | TLV-E | 4-x |

FIG. 7B

FD signalling payload message content

| IEI | Information Element | Type/Reference | Presence | Format | Length |
|-----|---------------------|----------------|----------|--------|--------|
| | FD signalling payload message identity | message type 15.2.2 | M | V | 1 |
| | Data and time | Data and time 15.2.8 | M | V | 5 |
| | Conversation ID | Conversation ID 15.2.9 | M | V | 16 |
| | Message ID | Message ID 15.2.10 | M | V | 16 |
| 21 | InReply To message ID | InReply To message ID 15.2.11 | O | TV | 17 |
| 22 | Application ID | Application ID 15.2.7 | O | TV | 2 |
| 9- | FD disposition request type | FD disposition request type 15.2.4 | O | TV | 1 |
| A- | Mandatory download | Mandatory download 15.2.16 | O | TV | 1 |
| 78 | payload | payload 15.2.13 | O | TLV-E | 3-x |
| 79 | Metadata | Metadata 15.2.17 | O | TLV-E | 3-x |
| 51 | Sender MCData user ID | MCData user ID 15.2.15 | O | TLV-E | 4-x |

FIG. 7C

SDS notification message content

| IEI | Information Element | Type/Reference | Presence | Format | Length |
|-----|--------------------|-----------------|----------|--------|--------|
| | SDS notification message identity | message type 15.2.2 | M | V | 1 |
| | SDS disposition notification type | SDS disposition notification type 15.2.5 | M | V | 1 |
| | Data and time | Data and time 15.2.8 | M | V | 5 |
| | Conversation ID | Conversation ID 15.2.9 | M | V | 16 |
| | Message ID | Message ID 15.2.10 | M | V | 16 |
| 22 | Application ID | Application ID 15.2.7 | O | TV | 2 |
| 7D | Extended Application ID | Extended Application ID 15.2.24 | O | TLV-E | 3-x |
| 51 | Sender MCData user ID | MCData user ID 15.2.15 | O | TLV-E | 4-x |

FIG. 7D

FD notification message content

| IEI | Information Element | Type/Reference | Presence | Format | Length |
|---|---|---|---|---|---|
| | FD notification message identity | message type 15.2.2 | M | V | 1 |
| | FD disposition notification type | FD disposition notification type 15.2.6 | M | V | 1 |
| | Data and time | Data and time 15.2.8 | M | V | 5 |
| | Conversation ID | Conversation ID 15.2.9 | M | V | 16 |
| | Message ID | Message ID 15.2.10 | M | V | 16 |
| 22 | Application ID | Application ID 15.2.7 | O | TV | 2 |
| 51 | Sender MCData user ID | MCData user ID 15.2.15 | O | TLV-E | 4-x |

FIG. 8

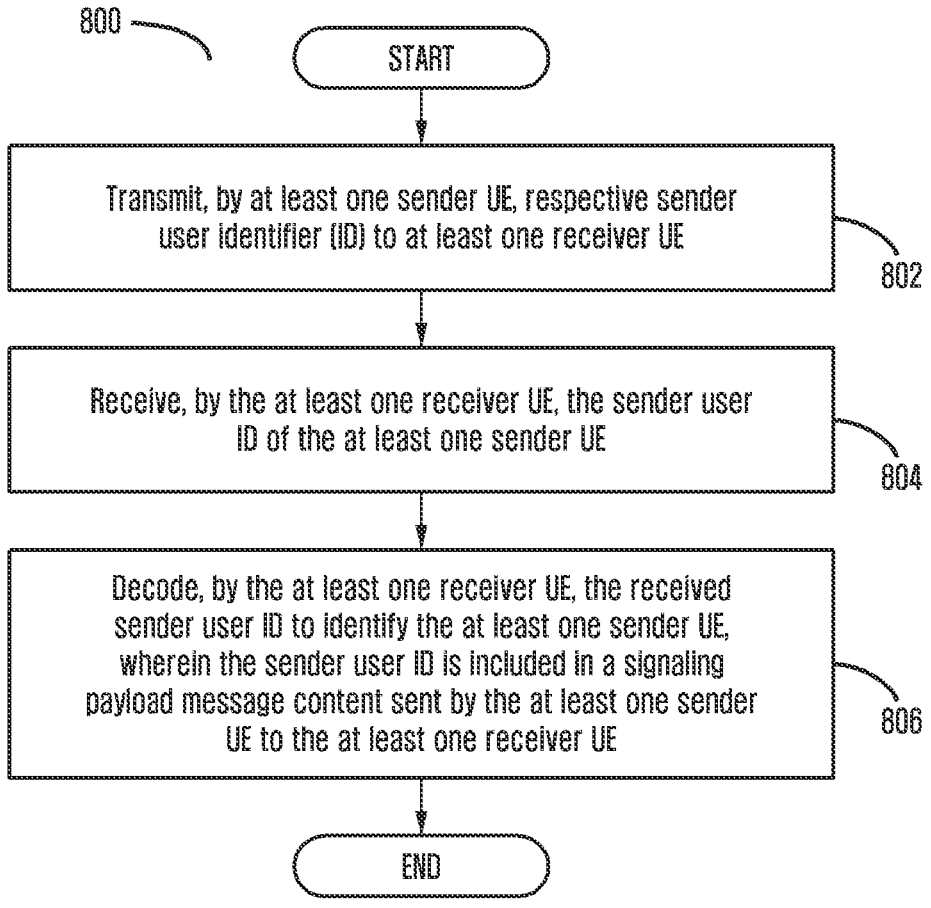

800

START

Transmit, by at least one sender UE, respective sender user identifier (ID) to at least one receiver UE

802

Receive, by the at least one receiver UE, the sender user ID of the at least one sender UE

804

Decode, by the at least one receiver UE, the received sender user ID to identify the at least one sender UE, wherein the sender user ID is included in a signaling payload message content sent by the at least one sender UE to the at least one receiver UE

806

END

900

START

Trigger, by a sender User Equipment (UE), transmission
of data to at least one receiver UE

902

Add, by the sender UE, a sender user identifier (ID) in a
signaling payload of the data to be transmitted

904

Transmit, by the sender UE, the data with the sender
user ID in the signaling payload to the at least one
receiver UE

906

END

FIG. 11

| Message Type | Data & Time | Conversation ID | Message ID | InReplyTo Message ID | Application ID | Sender MCData User ID |
|---|---|---|---|---|---|---|

METHODS AND SYSTEMS FOR MANAGING MISSION CRITICAL DATA (MCDATA) SESSIONS

CROSS-REFERENCE TO RELATED APPLICATION(S)

This application is a continuation application, claiming priority under § 365(c), of an International application No. PCT/KR2021/006358, filed on May 21, 2021, which is based on and claims the benefit of an Indian Provisional patent application number 202041021695, filed on May 22, 2020, in the Indian Intellectual Property Office, and of an Indian Non-Provisional patent application number 202041021695, filed on May 14, 2021, in the Indian Intellectual Property Office, the disclosure of each of which is incorporated by reference herein in its entirety.

BACKGROUND

1. Field

The disclosure relates to the field of mission critical (MC) services. More particularly, the disclosure relates to managing sender users and data in Mission Critical Data (MCData) sessions.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency millimeter wave (mmWave) bands, e.g., 60 gigahertz (60 GHz) bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Mission Critical Data (MCData) communication system provides mission critical services such as short data transfer, file transfer, data streaming, IP connectivity, and so on. The MCData communication system supports a private (1:1) session or a group session. In the MCData communication system, any user/User Equipment (UE) may send data (for example, a message, a file, a content, or the like) in the group session, so that everyone involved in the group session may receive the data rather than only an initiator UE, who has initiated the group session.

In the MCData communication system, on initiating the group session by the initiator UE, information about the initiator UE may be shared to all the UEs involved in the group. Any UE in the group session, who has a permission may send the data to the other UEs present in the same group session. The 3rd generation partnership project (3GPP) standard specification 24.582 has provided specifications for sharing the data in the group session over a media plane. The UE may use a MCData signaling payload as depicted in FIG. 1 (in accordance with the 3GPP standard specification 24.582) to share the data in the group session. However, the UEs involved in the group session may not be able to know a sender of the data. Such a problem may be more evitable in the group session, where any UE may send the data to other UEs.

Aspects of the disclosure are to address at least the above-mentioned problems and/or disadvantages and to provide at least the advantages described below. Accordingly, an aspect of the disclosure is to provide methods and systems for managing Mission Critical Data (MCData) sessions.

Another aspect of the disclosure is to provide methods and systems for enabling a sender User Equipment (UE) to add a sender user identifier (ID) in a signaling payload of data, while sending the data to one or more receiver UEs in a MCData session established over a media plane.

Another aspect of the disclosure is to provide methods and systems for enabling the one or more receiver UEs to decode the signaling payload of the data to identify the sender UE of the data.

Additional aspects will be set forth in part in the description which follows and, in part, will be apparent from the description, or may be learned by practice of the presented embodiments.

In accordance with an aspect of the disclosure, a method for managing Mission Critical Data (MCData) sessions is provided. The method includes triggering, by a sender User Equipment (UE), transmission of data to at least one receiver UE, adding, by the sender UE, a sender user identifier (ID) in a signaling payload of the data to be transmitted, and transmitting, by the sender UE, the data with the sender user ID in the signaling payload to the at least one receiver UE.

The method may further include receiving, by the at least one receiver UE, the signaling payload of the data from the sender UE. The method may further include decoding, by the at least one receiver UE, the sender user ID added in the signaling payload of the received data to identify the sender UE of the received data.

Accordingly, embodiments herein provide a mission critical data (MCData) communication system comprising a plurality of User Equipment (UEs). A sender UE of the plurality of the UEs is configured to trigger transmission of data to at least one receiver UE. The sender UE is configured to add a sender user identifier (ID) in a signaling payload of the data to be transmitted. The sender UE is configured to transmit the data with the sender user ID in the signaling payload to the at least one receiver UE.

A receiver UE of the at least one receiver UE is configured to receive the signaling payload of the data from the sender UE and decode the sender user ID added in the signaling payload of the received data to identify the sender UE of the received data.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 depicts a Mission Critical Data (MCData) signaling payload used in conventional approaches for exchanging data between User Equipment (UEs) in a MCData session according to an embodiment of the disclosure;

FIGS. 7A, 7B, 7C, and 7D depict signaling payloads for the data corresponding to a short data service (SDS) and a File Distribution (FD service), according to various embodiments of the disclosure;

FIG. 8 is a flow diagram depicting a method for managing the MCData session, according to an embodiment of the disclosure;

FIG. 11 depicts a MCData signaling payload, according to an embodiment of the disclosure;

Throughout the drawings, it should be noted that like reference numbers are used to depict the same or similar elements, features, and structures.

DETAILED DESCRIPTION

Figure 2:
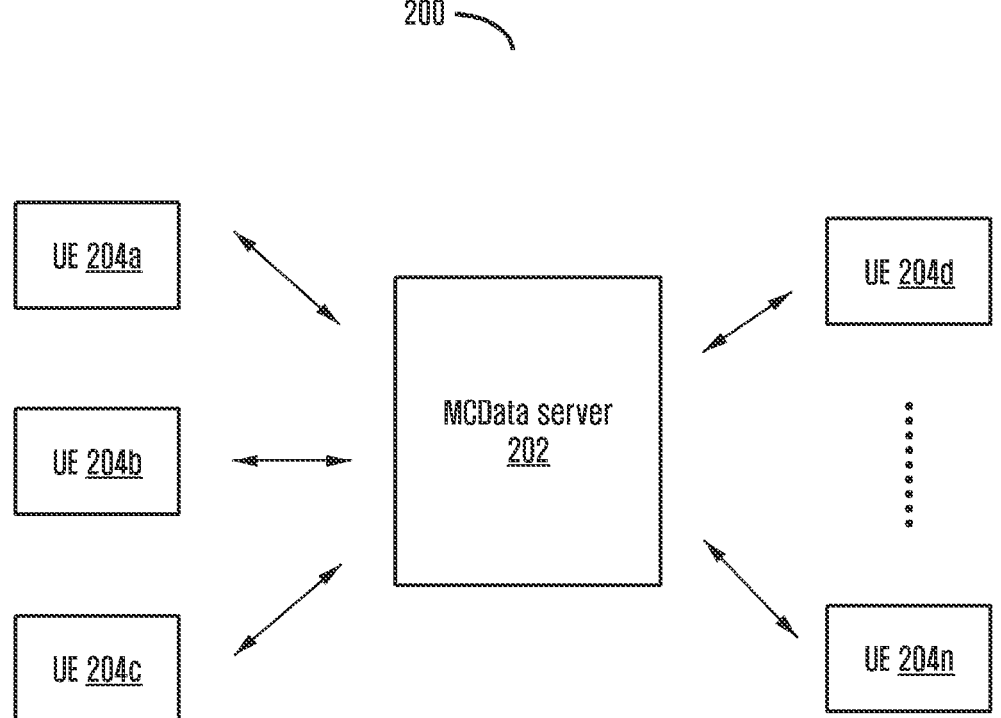
FIG. 2 depicts a MCData communication system, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for managing Mission Critical Data (MCData) sessions.

Referring now to the drawings, and more particularly to FIGS. 2 to 6, 7A, 7B, 7C, 7D, and 8 to 13, where similar reference characters denote corresponding features consistently throughout the figures, there are shown example embodiments.

Embodiments herein use the terms such as "initiator UE", "MCData initiator", and so on, interchangeably to refer to a UE that initiates Mission Critical Data (MCData) sessions.

Embodiments herein use the terms such as "sender UE", "sender MCData client", "data sender", "MCData originating device/client" and so on, interchangeably to refer to a UE that sends data to other UEs present in a same group.

Embodiments herein use the terms such as "receiver UE", "receiver MCData client", "receiver", "MCData terminating device/client", and so on, interchangeably to refer to a UE that receives the data from the other UEs.

Embodiments herein use the terms "sender user ID", "MCData User ID", and so on, interchangeably to refer to an identifier, which may be used to identify the sender of the data.

Embodiments herein use the term "signaling payload message content", "signaling payload message", and so on, interchangeably to refer to a signaling payload used for the data that includes a message.

Embodiments herein use the term "notification message content", "notification payload message", and so on, interchangeably to refer to the signaling payload used for the data that includes the notification.

Figure 1:
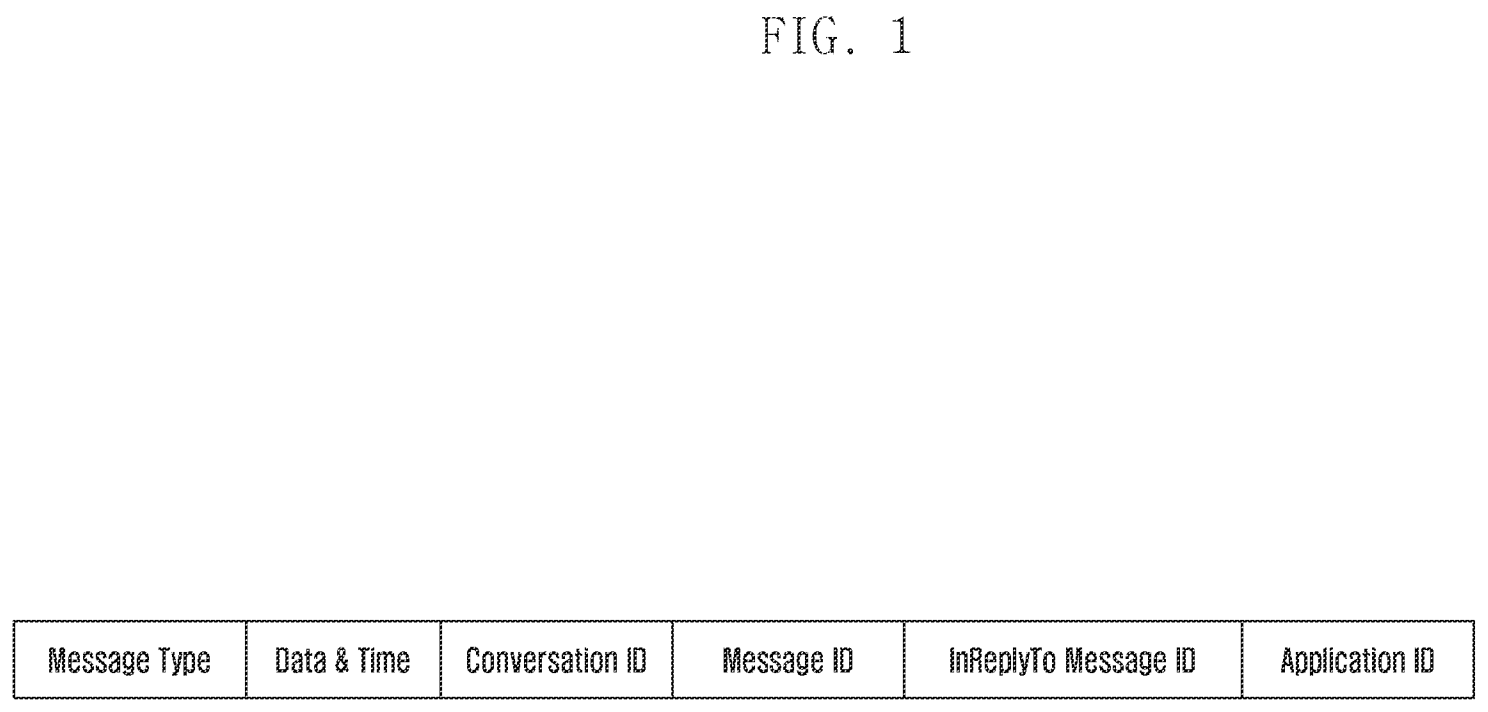

FIG. 1 depicts a Mission Critical Data (MCData) signaling payload used in conventional approaches for exchanging data between User Equipment (UEs) in a MCData session according to an embodiment of the disclosure.

FIG. 2 depicts a Mission Critical Data (MCData) communication system 200, according to an embodiment of the disclosure. The MCData communication system 200 referred herein may be configured to provide MCData services to users in public safety incident scenarios. The MCData services may include services such as, but are not limited to, a Short Data Service (SDS), a File Distribution (FD) service, Internet Protocol (IP) connectivity, and so on. Examples of the SDS and the FD service may be, but are not limited to, short data transfer, file transfer, data streaming, and so on. In an example, the MCData communication system 200 may provide the MCData services to the users over a signaling plane. In another example, the MCData communication system 200 may provide the MCData services to the users over a media plane. The MCData communication system 200 may support at least one of a private one-to-one session, a one-to-many session, and a group session to provide the MCData services to the users.

Referring to FIG. 2, the MCData communication system 200 includes a MCData server 202, and a plurality of User Equipment (UEs) 204a-204n.

The MCData server 202 may be configured to provide a centralized support in providing the MCData services to the plurality of UEs 204a-204n present in a single group, for which the MCData server 202 belongs to. The MCData server 202 may be coupled to core elements of a network through Base Stations (BSs) to provide the MCData services to the plurality of UEs 204. Examples of the network may be, but are not limited to, a Third Generation Partnership Project (3GPP) 3rd Generation (3G), an Long Term Evolution (LTE/4G) network, an LTE-Advanced (LTE-A) network, a Fifth Generation (5G) New Radio (NR) network, a Wireless Local Area Network (WLAN), a Worldwide Interoperability for Microwave Access (WiMAX/institute of electrical and electronics engineers (IEEE) 802.16), wireless-fidelity (Wi-Fi) (IEEE 802.11), an Evolved-universal terrestrial radio access new radio (E-UTRA), an LTE/4G communication system, a 5G/NR communication system, or any other next generation networks. The MCData server 202 may use a hypertext transfer protocol (HTTP) as a communication transport means for the MCData services.

The plurality of UEs 204a-204n referred herein may be devices used by the users, which support the MCData services. Examples of the UE (204a-204n) may be, but are not limited to, a mobile phone, a smartphone, a tablet, a phablet, a personal digital assistant (PDA), a laptop, a computer, a wearable computing device, a walkie-talkie/handheld transceiver, a vehicle infotainment device, an Internet of Things (IoT) device, or any other device that supports the MCData services.

Each of the UE (204a-204n) may register with the MCData server 202 to receive/transfer data from/to another UE on the media plane by establishing MCData sessions with the MCData server 202 over a Message Session Relay Protocol (MSRP). In an embodiment herein, the established MCData sessions may be group sessions (hereinafter may be referred as MCData group sessions) over the media plane. In an embodiment herein, the data may be a message. In an example, the message includes at least one of a content, a file, a media (audio, a video, an image, or the like), a text, and so on. In another embodiment herein, the data may be a notification. The notification may be an acknowledgment, which has been generated by the UE (204a-204n), on receiving the data/message from another UE (204a-204n). Establishing the MCData sessions by the UE (204a-204n) to exchange the data between each other may be intuitively inferred by one of ordinary skill in the art by referring to the 3 GPP specification TS 24.582, and thus, its detailed description is omitted.

Each of the plurality of UEs 204a-204n may act as at least one of an initiator UE (204a-204n), a sender UE (for example: a UE 204a), and a receiver UE (for example: a UE (204b-204n)). The initiator UE (204a-204n) may be the UE, which initiates the MCData session/MCData group session by forming a group of UEs and enables the UEs 204 to exchange the data between each other through the MCData server 202 over the media plane. Establishing the MCData sessions by the UEs 204a-204n to exchange the data between each other may be intuitively inferred by one of ordinary skill in the art by referring to the 3GPP specification TS 24.582, and thus, its detailed description is omitted. The sender UE 204a may be the UE, which sends the data to the other UEs 204b-204n present in the same group, over the media plane. The sender UE 204a may send the data to the UEs 204b-204n through the MCData server 202. In an example, the sender UE 204a may be the initiator UE. In another example, the sender UE 204a may not be the initiator UE. The receiver UE (204b) may be the UE, which receives the data from the other UEs (204a, 204c-204n) through the MCData server 202.

In an embodiment, the sender UE 204a may be configured to send the data to the one or more receiver UEs 204b-204n by indicating its identity, so that the one or more receiver UEs 204b-204n may be able to identify the sender of the data.

For sending the data to the one or more receiver UEs 204b-204n, the sender UE 204a triggers transmission of the data to the one or more receiver UEs 204 present in the same group, over the media plane. The sender UE 204a triggers the transmission of the data, on initiating the MCData session by the initiator UE (204a-204n).

On triggering the transmission of the data, the sender UE 204a adds the sender user ID in a signaling payload of the data, which has to be transmitted to the one or more receiver UEs 204b-204n. The sender user ID may be used to identify the sender of the data. The sender user ID may be a MCData User ID. In an embodiment, the signaling payload may include the signaling payload message content, if the data includes the message. In another embodiment, the signaling payload may include the notification message content, if the data includes the notification.

In an embodiment, the sender UE 204a adds the sender user ID in the signaling payload of the data by adding an additional Information Element (IE) in the signaling payload of the data. Thus, the signaling payload of the data includes the IE corresponding to the sender user ID and one or more IEs corresponding to the data. The IE corresponding to the sender user ID and the data may be associated with various fields such as, but are not limited to, an information element index (IEI) field, a type field, a presence field, a format field, a length field, or the like, which provides information about the sender user ID and the data, respectively.

Embodiments herein explain the associated fields of the IE corresponding to the sender user ID (as depicted in FIGS. 7A to 7D). The IEI field depicts a value of the sender user ID. The type field depicts a type of the sender user ID. The format field depicts a format of the sender user ID. The length field depicts a length of the sender user ID.

Embodiments herein explain the one or more IEs of the signaling payload for the data (the signaling payload message content), wherein the data includes the message corresponding to the SDS (as depicted in FIG. 7A). The IEs depict at least one of an SDS signaling payload message identity, date and time, a conversation ID, a message ID, an in-reply/response to message ID, an application ID, an SDS disposition request type, an extended application ID, and so on.

Embodiments herein explain the one or more IEs of the signaling payload for the data (the signaling payload message content), wherein the data includes the message corresponding to the FD service (as depicted in FIG. 7B). The IEs depict at least one of a FD signaling payload message identity, date and time, a conversation ID, a message ID, a in reply to message ID, an application ID, a FD disposition request type, a mandatory download, a payload, a metadata, and so on.

Embodiments herein explain the one or more IEs of the signaling payload (the notification message content) for the data, wherein the data includes the notification corresponding to the SDS (as depicted in FIG. 7C). The IEs depict at least one of an SDS notification message identity, an SDS disposition notification type, date and time, a conversation ID, a message ID, an application ID, an extended application ID, and so on.

Embodiments herein explain the one or more IEs of the signaling payload (the notification message content) for the data, wherein the data includes the notification corresponding to the FD service (as depicted in FIG. 7D). The IEs depicts at least one of a FD notification message identity, a FD disposition notification type, date and time, a conversation ID, a message ID, an application ID, and so on.

On adding the sender user ID in the signaling payload of the data, the sender UE 204a transmits the signaling payload of the data to the one or more receiver UEs 204b-204n through the MCData server 202. The signaling payload includes the data and the sender user ID.

The receiver UE(s) (204b-204n) may be configured to receive the signaling payload of the data from the sender UE 204a and decode the signaling payload of the data to obtain the sender user ID and the data. The receiver UE 204b-204n decodes the IE corresponding to the sender user ID and the associated fields to obtain the sender user ID. The receiver UE 204b-204n uses the sender user ID to identify the sender of the data (i.e., to identify the sender UE 204a which has been transmitted the data). The receiver UE 204b-204n decodes the one or more IEs corresponding to the data and the associated fields to obtain the data.

The MCData server 202 may be configured to aggregate the data received from the sender UE 204a and send the aggregated data to the one or more receiver UEs 204b-204n. The MCData server 202 may aggregate the data in accordance with the 3GPP specification TS 24.282. Thereby saving resources. In an embodiment herein, the data may be multiple disposition notifications.

FIG. 2 show blocks of the MCData communication system 200, but it is to be understood that other embodiments are not limited thereon. In other embodiments, the MCData communication system 200 may include less or more number of blocks. Further, the labels or names of the blocks are used only for illustrative purpose and does not limit the scope of the embodiments herein. One or more blocks can be combined together to perform same or substantially similar function in the MCData communication system 200.

Figure 3:
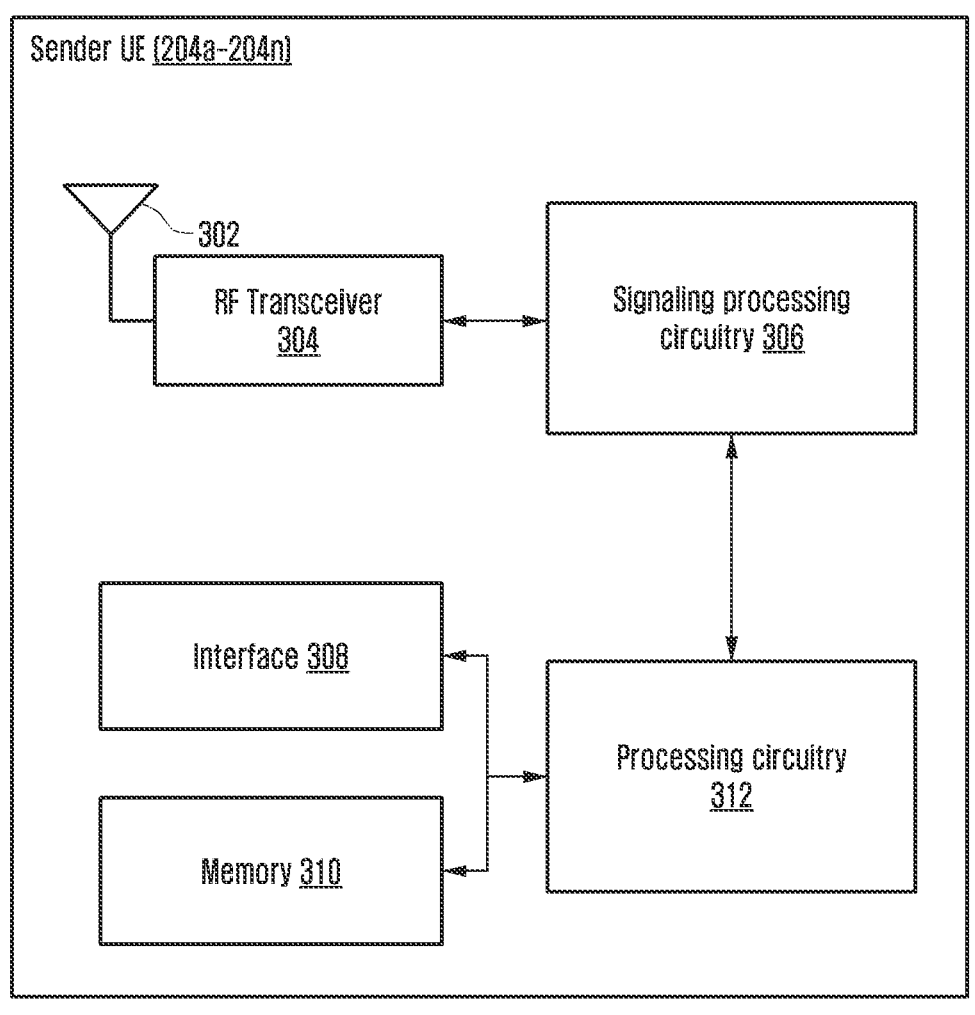
FIG. 3 is an example block diagram depicting various components of a sender UE to send data to one or more receiver UEs by indicating a sender user identifier (ID), according to an embodiment of the disclosure.

FIG. 3 is an example block diagram depicting various components of the sender UE (for example: the UE 204a) to send the data to the one or more receiver UEs 204b-204n by indicating the sender user ID, according to an embodiment of the disclosure The sender UE 204a includes at least one antenna 302, at least one RF transceiver 304, a signaling processing circuitry 306, an interface 308, a memory 310, and a processing circuitry 312.

Referring to FIG. 3, the antenna 302 may be configured to receive Radio Frequency (RF) signals from the RF transceiver 304 and send the RF signals to the one or more receiver UEs 204b-204n through the MCData server 202. The RF signals may correspond to the data.

The RF transceiver 304 may be configured to up convert Intermediate Frequency (IF) signals that have been received from the signaling processing circuitry 306 to the RF signals.

The signaling processing circuitry 306 may be configured to receive the data from the processing circuitry 312 and generates the IF signals by performing at least one of encoding the received data, multiplexing the received data, and so on. The signaling processing circuitry 306 further provides the generated IF signals to the RF transceiver 304.

The interface 308 may be configured to enable the sender UE 204a to communicate with the MCData server 202 over an interface supported by the network. Examples of the interface may be at least one of but is not limited to, a wired or wireless fronthaul interface, a wired or wireless backhaul interface, or any structure supporting communications over a wired or wireless connection.

The memory 310 may store at least one of the data, the signaling payload, and so on. The memory 310 may also store a data manager 400, which may be executed by the processing circuitry 312 to send the data to the one or more receiver UEs 204b-204n through the MCData server 202. Examples of the memory 310 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 310 may include one or more computer-readable storage media. The memory 310 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 310 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The processing circuitry 312 includes at least of, a single processer, a plurality of processors, multiple homogeneous or heterogeneous cores, multiple Central Processing Units (CPUs) of different kinds, microcontrollers, special media, and other accelerators.

The processing circuitry 312 may be configured to trigger transmission of the data to the one or more receiver UEs 204b-204n and send the data to the one or more receiver UEs 204b-204n through the MCData server 202. In an embodiment, for sending the data to the one or more receiver UEs 204b-204n, the processing circuitry 312 adds the sender user ID to the signaling payload of the data and sends the signaling payload of the data to the one or more receiver UEs 204b-204n. The signaling payload of the data may include the data and the sender user ID, so that the one or more receiver UEs 204b-204n may identify the sender UE 204a of the data.

Figure 4:
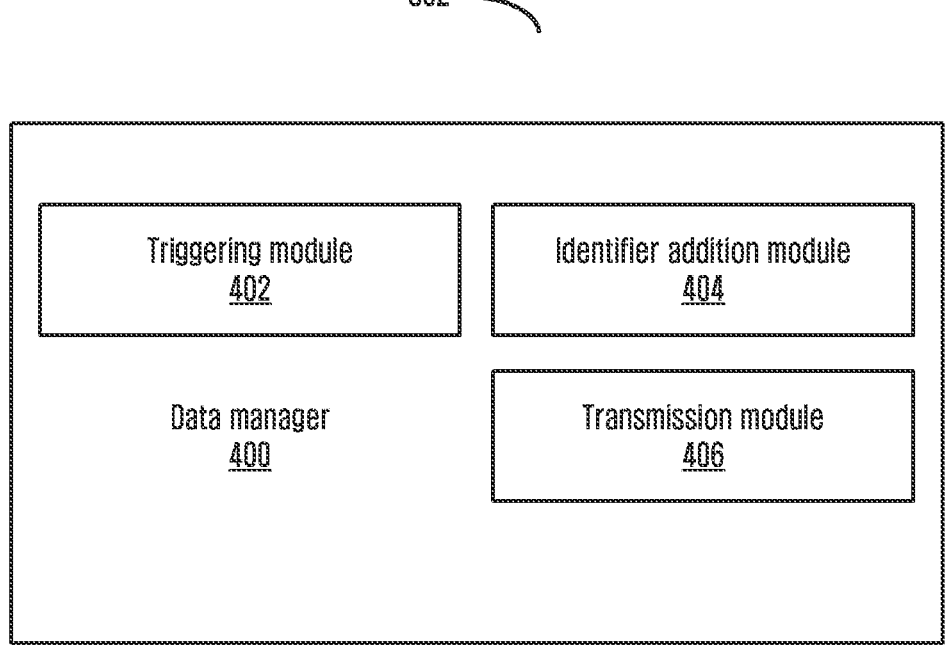
FIG. 4 depicts a data manager performable in the sender UE to send the data to one or more receiver UEs by indicating the sender user ID, according to an embodiment of the disclosure.

The processing circuitry 312 may execute/process the data manager 400 to send the data to the one or more receiver UEs 204b-204n. As depicted in FIG. 4, the data manager 400 includes a triggering module 402, an identifier addition module 404, and a transmission module 406.

The triggering module 402 may be configured to trigger the transmission of the data to the one or more receiver UEs 204b-204n over the media plane in the group session. The data may include the message. Alternatively, the data may include the notification. The triggering module 402 triggers the transmission of the data, on establishing the MCData server 202 over the MSRP by the initiator UE (204a-204n).

The identifier addition module 404 may be configured to create the signaling payload for the data. The signaling payload comprises the data and the sender user ID. The sender user ID may be the MCData User ID, which depicts the identity of the sender UE 204a. In an embodiment, the signaling payload may include the signaling payload message content, if the data includes the message. In another embodiment, the signaling payload may include the notification message content, if the data includes the notification. The signaling payload includes the IE corresponding to the sender user ID and the one or more IEs corresponding to the data. The IE corresponding to the sender user ID and the data may be associated with the various fields such as, but are not limited to, the IEI field, the type field, the presence field, the format field, the length field, and so on, which provides information about the sender user ID, and the data, respectively.

The transmission module 406 may be configured to transmit the signaling payload of the data to the MCData server 202, which further forwards the signaling payload of the data to the one or more receiver UEs 204b-204n over the media plane.

FIG. 4 depicts a data manager performable in the sender UE to send the data to one or more receiver UEs by indicating the sender user ID, according to an embodiment of the disclosure.

FIGS. 3 and 4 show blocks of the sender UE 204a, but it is to be understood that other embodiments are not limited thereon. In other embodiments, the sender UE 204a may include less or more number of blocks. Further, the labels or names of the blocks are used only for illustrative purpose and does not limit the scope of the embodiments herein. One or more blocks can be combined together to perform same or substantially similar function in the sender UE 204a.

Figure 5:
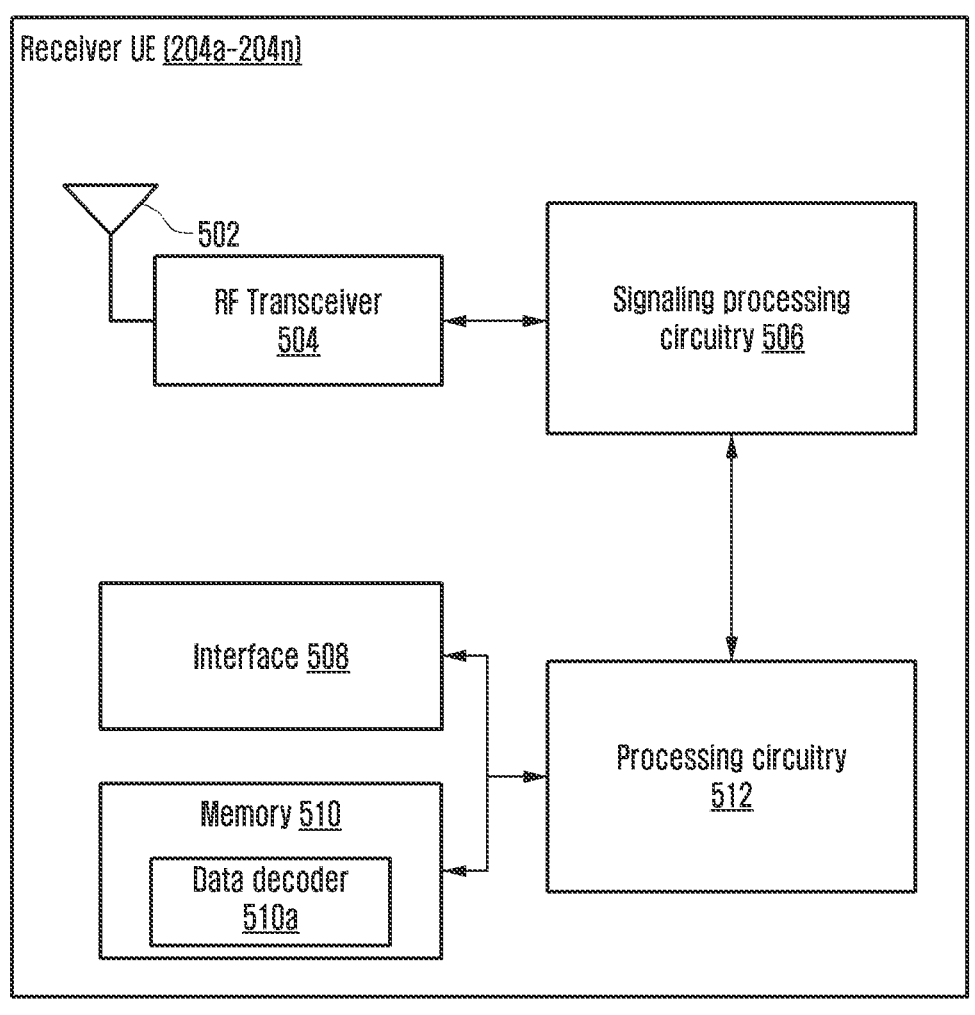
FIG. 5 is an example diagram depicting various components of a receiver UE to identify a sender of the data, according to an embodiment of the disclosure.

FIG. 5 is an example diagram depicting various components of the receiver UE (for example: the UE 204b) to identify the sender of the data, according to an embodiment of the disclosure. The receiver UE 204b includes at least one antenna 502, at least one RF transceiver 504, a signaling processing circuitry 506, an interface 508, a memory 510, and a processing circuitry 512.

Referring to FIG. 5, the antenna 502 may be configured to receive the RF signals from the MCData server 202 and provides the received RF signals to the RF transceiver 504.

The RF transceiver 504 may be configured to generate the IF signals by down converting the received RF signals. The RF transceiver 304 may provide the generated IF signals to the signaling processing circuitry 506.

The signaling processing circuitry 506 may be configured to perform at least one processing action (filtering, decoding, digitizing the IF signals (conversion of analog to digital form), and so on) on the IF signals. The signaling processing circuitry 506 provides the processed IF signals to the processing circuitry 512 for further processing. In an example herein, the processed IF signals may include the signaling payload of the data transmitted by the sender UE 204a.

The interface 508 may be configured to enable the receiver UE 204b to communicate with the MCData server 202 over an interface supported by the network. Examples of the interface may be, but are not limited to, a wired or wireless fronthaul interface, a wired or wireless backhaul interface, or any structure supporting communications over a wired or wireless connection.

The memory 510 may store at least one of the data, the signaling payload, and so on. The memory 510 may also store a data decoder 510a, which may be executed by the processing circuitry 512 to decode the signaling payload received from the sender UE 204a through the MCData server 202. Examples of the memory 510 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 310 may include one or more computer-readable storage media. The memory 510 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 510 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The processing circuitry 512 includes at least of, a single processer, a plurality of processors, multiple homogeneous or heterogeneous cores, multiple Central Processing Units (CPUs) of different kinds, microcontrollers, special media, and other accelerators. The processing circuitry 512 may be configured to decode the signaling payload of the data to obtain the sender user ID and the data. The processing circuitry 512 may use the sender user ID to identify the sender UE 204a.

The processing circuitry 512 executes/processes the data decoder 510a to decode the signaling payload of the data. The data decoder 510a may be configured to decode the signaling payload of the data to obtain the sender user ID and the data. The data decoder 510a decodes the IE corresponding to the sender user ID and the associated fields to obtain the sender user ID. The data decoder 510a uses the obtained sender user ID to determine the sender UE 204a. The data decoder 510a decodes the one or more IEs corresponding to the data and the associated fields to obtain the data. In an example, the obtained data may be the message. In another example, the obtained data may be the notification.

FIG. 5 shows blocks of the receiver UE 204b, but it is to be understood that other embodiments are not limited thereon. In other embodiments, the receiver UE 204b may include less or more number of blocks. Further, the labels or names of the blocks are used only for illustrative purpose and does not limit the scope of the embodiments herein. One or more blocks can be combined together to perform same or substantially similar function in the receiver UE 204b.

Figure 6:
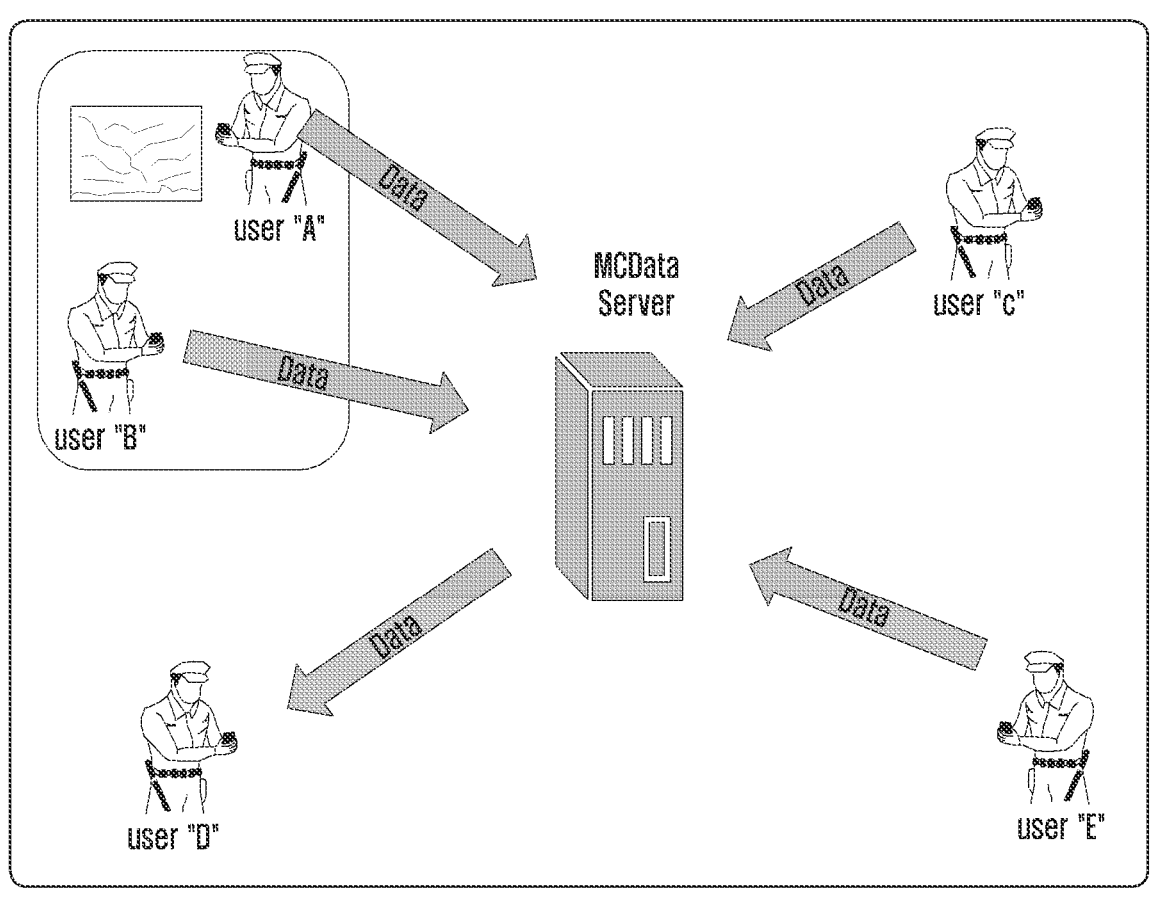
FIG. 6 depicts an example use case scenario of managing the data in a MCData session, according to an embodiment of the disclosure.

FIG. 6 depicts an example use case scenario of managing the data in the MCData session, according to an embodiment of the disclosure.

Referring to FIG. 6, consider an example scenario, wherein among six UEs/users (UE A, B, C, D, E, and F) of a fire group, a UE A initiates the MCData session/group session to address fire situation at a site 1. In such a scenario, the user A (the initiator UE) sends the data (for example: image files) about the site 1 to the group members through the MCData server 202. On sending the data by the user A/initiator UE, the UE B starts sending the data to the other UEs in the fire group through the MCData server 202, based on observations. Embodiments herein enable the UE B to send the data to the other UEs by adding the sender user ID in the signaling payload of the data. Therefore, the received UEs may be able to identify sender of the data by decoding the received signaling payload of the data.

FIGS. 7A, 7B, 7C, and 7D depict the signaling payloads for the data corresponding to the SDS and the FD service, according to various embodiments of the disclosure. The signaling payloads of the data corresponding to the SDS and the FD service include the IE corresponding to the sender user ID in addition to the one or more IEs corresponding to the data. The IE corresponding to the sender user ID and the associated fields provide information about the sender user ID, which may be used to identify the sender of the data. The data referred herein includes at least one of the message, and the notification.

An example table of FIG. 7A depicts the signaling payload for the message corresponding to the SDS (i.e., an SDS signaling payload message content). An example table of FIG. 7B depicts the signaling payload for the message corresponding to the FD service (i.e., a FD signaling payload message content).

An example table of FIG. 7C depicts the signaling payload for the notification corresponding to the SDS (i.e., an SDS notification message content). An example table of FIG. 7D depicts the signaling payload for the notification corresponding to the FD service (i.e., a FD notification message content).

FIG. 8 is a flow diagram 800 depicting a method for managing the MCData session, according to an embodiment of the disclosure.

At operation 802, the method includes transmitting, by the sender UE 204a, the respective sender user ID to the one or more receiver UEs 204b-204n.

At operation 804, the method includes receiving, by the one or more receiver UEs 204b-204n, the sender user ID of the sender UE 204a. The one or more receiver UEs 204b-204n may receive the sender user ID in the signaling payload of the data. The signaling payload includes the signaling payload message content if the data is the message. Alternatively, the signaling payload includes the notification message content if the data is the notification.

At operation 806, the method includes, decoding, by the one or more receiver UEs 204b-204n, the received sender user ID to identify the sender UE 204a of the data. The various actions in method 800 may be performed in the order presented, in a different order or simultaneously. Further, in some embodiments, some actions listed in FIG. 8 may be omitted.

Figure 9:
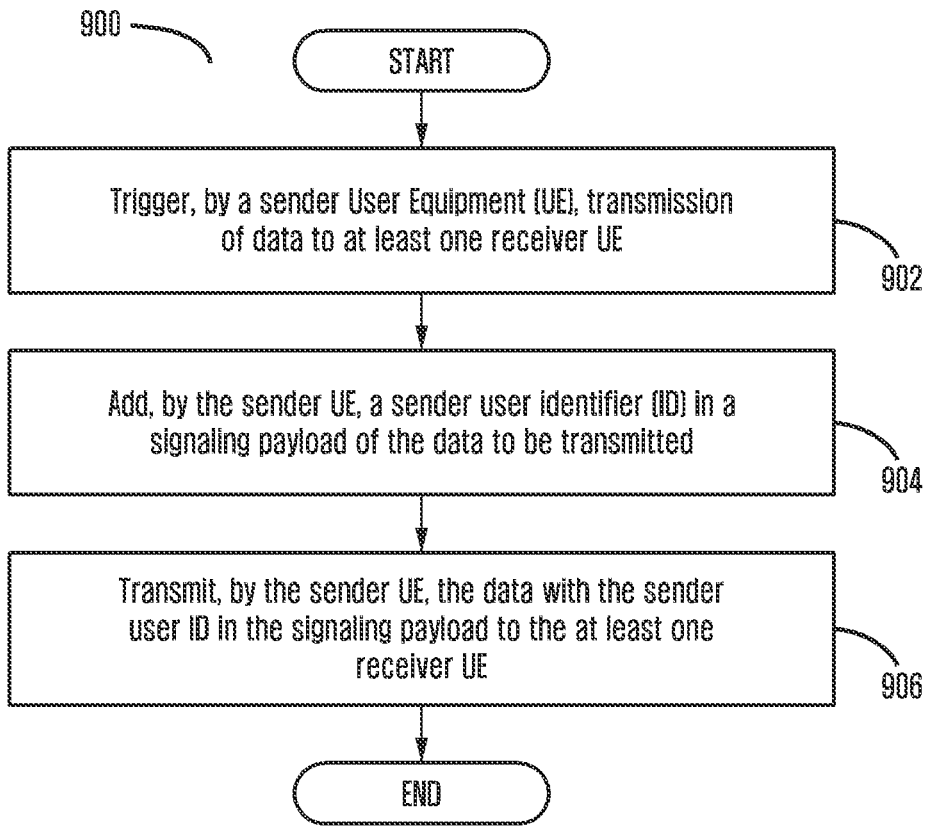
FIG. 9 is a flow diagram depicting a method for sending the data to the one or more receiver UEs, according to an embodiment of the disclosure.

FIG. 9 is a flow diagram 900 depicting a method for sending the data to the one or more receiver UEs 204b-204n, according to an embodiment of the disclosure.

At operation 902, the method includes triggering, by the sender UE 204a, the transmission of the data to the one or more receiver UEs 204b-204n, on initiating the MCData session/group session by the initiator UE (204a-204n). The sender UE 204a may be or may not be the initiator UE (204a-204n). In an example, the data includes the message. In another example, the data includes the notification sent by the at least one receiver UE 204b-204n as the acknowledgement in response to the message received from the sender UE 204a.

At operation 904, the method includes adding, by the sender UE 204a, the sender user ID in the signaling payload of the data to be transmitted. The sender UE 204a adds the sender user ID by adding the IE corresponding to the sender user ID in the signaling payload. The signaling payload includes the IE corresponding to the sender user ID and the one or more IEs corresponding to the data. The IE corresponding to the sender user ID is associated with at least one of the IEI field indicating the value of the sender user ID, the type field indicating the type of the sender user ID, the presence field, the format field indicating the format of the sender user ID, and the length field indicating the length of the sender user ID.

At operation 906, the method includes transmitting, by the sender UE 204a, the data with the sender user ID in the signaling payload to the at least one receiver UE 204b-204n. The various actions in method 900 may be performed in the order presented, in a different order or simultaneously. Further, in some embodiments, some actions listed in FIG. 9 may be omitted.

Figure 10:
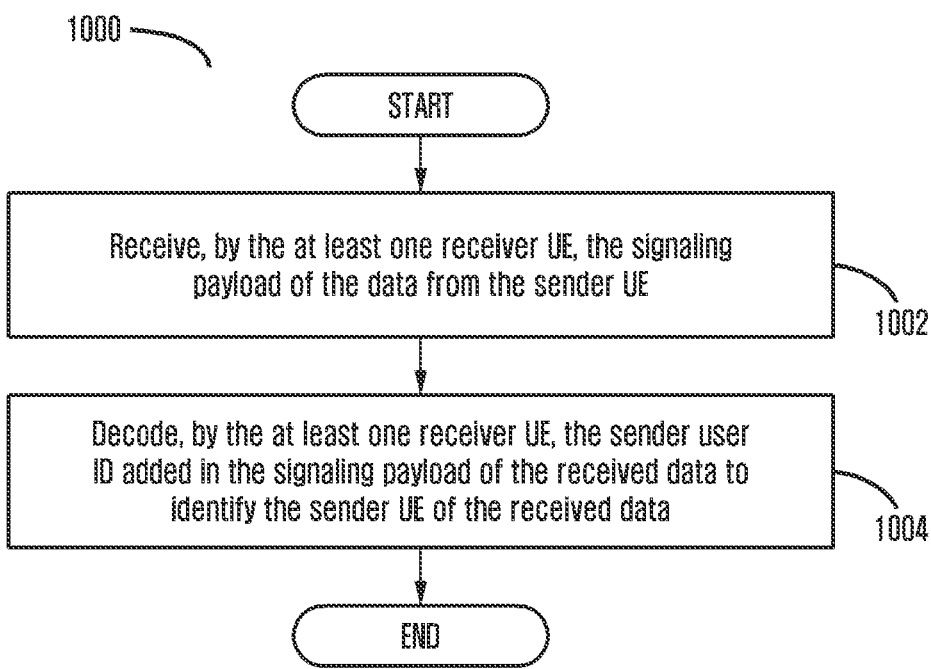
FIG. 10 is a flow diagram depicting a method for identifying the sender of the data in the MCData session, according to an embodiment of the disclosure.

FIG. 10 is a flow diagram 1000 depicting a method for identifying the sender of the data in the MCData session, according to an embodiment of the disclosure.

At operation 1002, the method includes receiving, by the one or more receiver UEs 204b-204n, the signaling payload of the data from the sender UE 204a.

At operation 1004, the method includes decoding, by the one or more receiver UEs 204b-204n, the sender user ID added in the signaling payload of the received data to identify the sender UE 204a of the received data. The one or more receiver UEs 204b-204n may decode the IE corresponding to the sender user ID and the associated at least one of the IEI field, the type field, the presence field, the format field, and the length field of the signaling payload of the received data in sequence to identify the sender UE of the received data. The various actions in method 1000 may be performed in the order presented, in a different order or simultaneously. Further, in some embodiments, some actions listed in FIG. 10 may be omitted.

Figure 11:
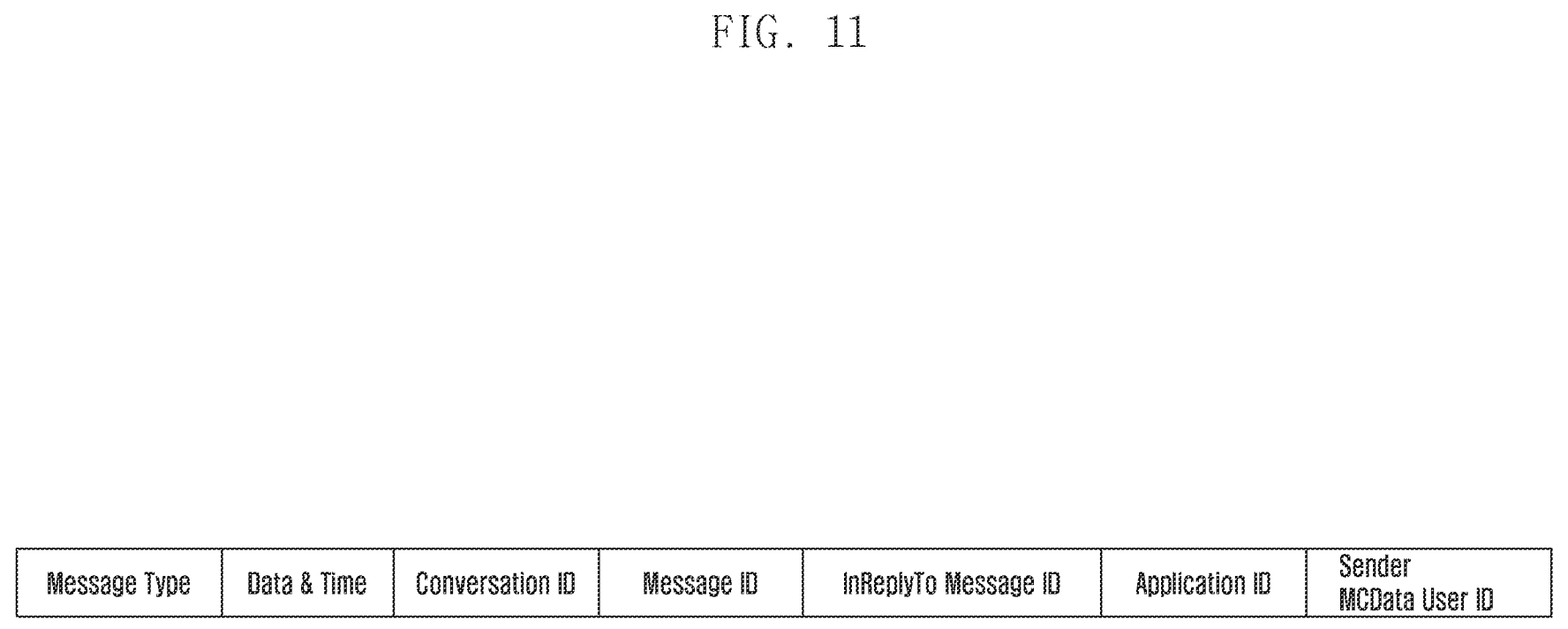

FIG. 11 depicts the MCData signaling payload, according to an embodiment of the disclosure. In a first method for sharing the sender user ID to the one or more receiver UEs 204b-204n, the sender user ID is included in the signaling payload by the sender UE 204a and the sender user ID is decoded by the one or more receiver UEs 204b-204n. In a second method for sharing the sender user ID to the one or more receiver UEs 204b-204n, an originating participating function may maintain a mapping between a MSRP URI and the sender user ID during an establishment of the MCData session over the MSRP. The originating participating function may be a component of the MCData server 202. Functions of the originating participating function is defined in the 3GPP specification TS 23.382, section 6.4.3.1.2. When a MSRP SEND from the sender UE 204a is received at the originating participating function, the originating participating function identifies the corresponding sender user ID, adds the corresponding sender user ID in the signalling payload and forwards further to the one or more receiver UEs 204b-204n. The one or more receiver UEs 204b-204n may decode the signaling payload and extract the sender user ID.

Figure 12:
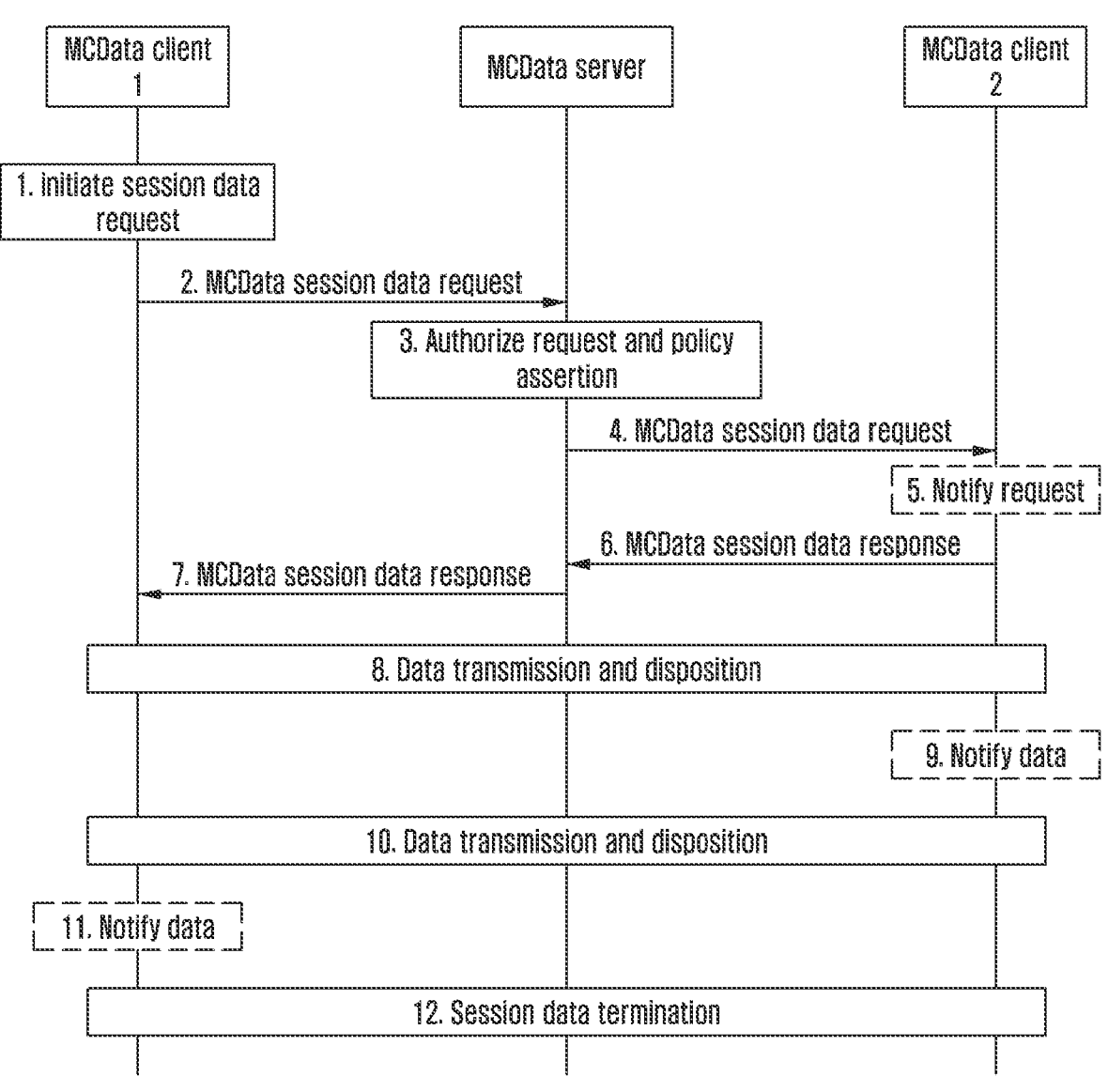
FIG. 12 is an example flow diagram depicting a MCData one to one SDS session, according to an embodiment of the disclosure.

FIG. 12 is an example flow diagram depicting a MCData one to one SDS session, according to an embodiment of the disclosure. As per 24.582, once an MSRP session has been established, the sender UE:

generates an SDS SIGNALLING PAYLOAD as specified in subclause 6.1.1.2.2;

generates an SDS DATA PAYLOAD as specified in subclause 6.1.1.2.3;

includes the SDS SIGNALLING PAYLOAD and SDS DATA PAYLOAD in an MSRP SEND request as specified in subclause 6.1.1.2.4; and sends the MSRP SEND request on the established MCData session over the MSRP.

The receiver UE (204b-204n)

decodes the contents of the application/vnd.3gpp.mcdata-signalling MIME body; and decodes the contents of the application/vnd.3gpp.mcdata-payload MIME body.

Figure 13:
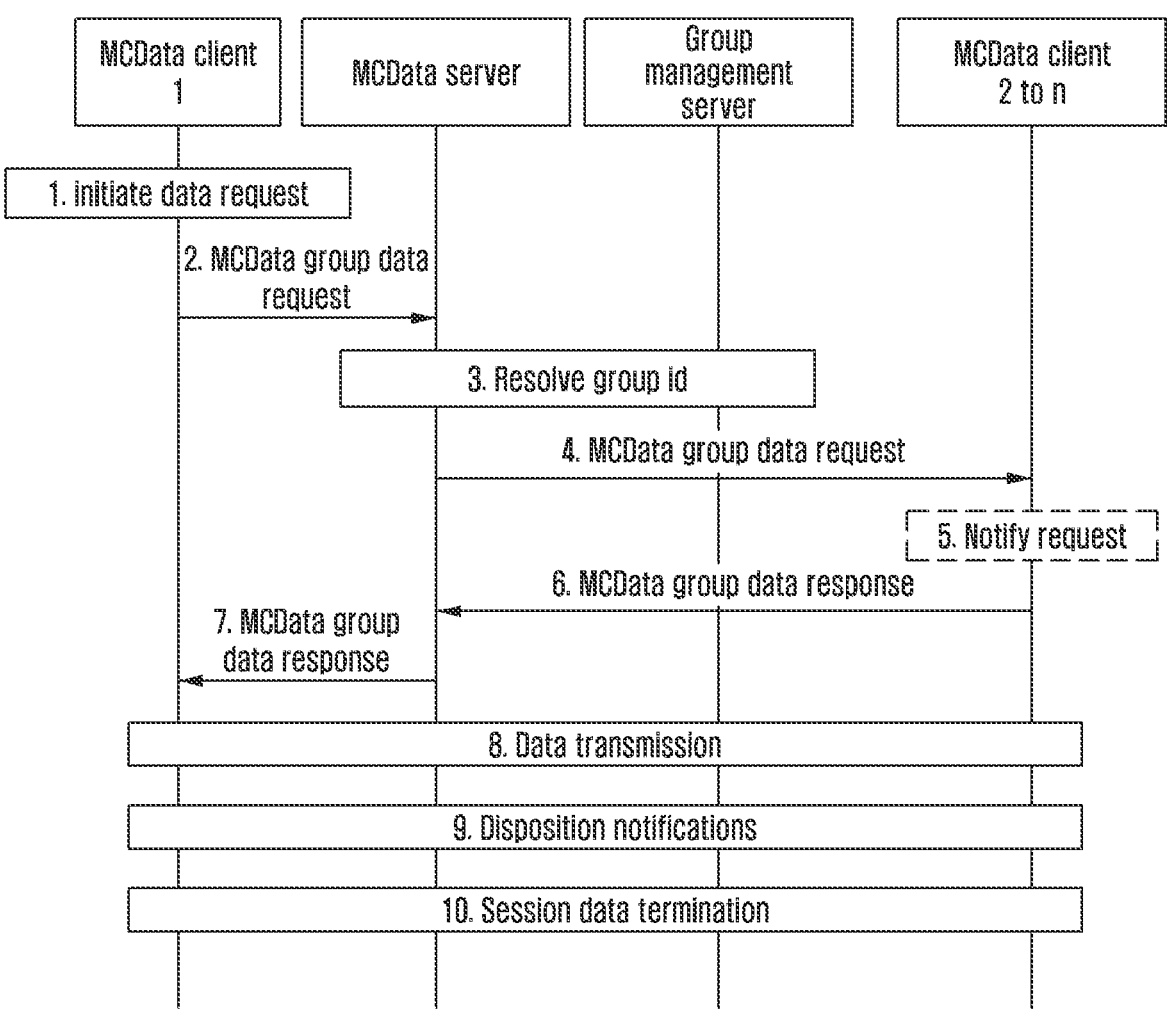
FIG. 13 is an example flow diagram depicting the MCData group SDS session, according to an embodiment of the disclosure.

FIG. 13 is an example flow diagram depicting the MCData group SDS session, according to an embodiment of the disclosure. As per 24.582, to send any MCData content, the sender UE 204a:

establishes a MSRP Session with Originating Participating Function;

generates an SDS SIGNALLING PAYLOAD as specified in subclause 6.1.1.2.2;

generates an SDS DATA PAYLOAD as specified in subclause 6.1.1.2.3;

includes the SDS SIGNALLING PAYLOAD and SDS DATA PAYLOAD in an MSRP SEND request as specified in subclause 6.1.1.2.4; and sends the MSRP SEND request on the established MSRP connection.

The receiver UE (204b-204n)

decodes the contents of the application/vnd.3gpp.mcdata-signalling MIME body; and decodes the contents of the application/vnd.3gpp.mcdata-payload MIME body.

Embodiments herein disclose methods and systems to:

identify a sender of a data in a Mission Critical Data (MCData) media plane session;

enable a sender device to send a sender MCData user identifier (ID) to terminating devices;

enable the sender to include the sender MCData user ID in a signaling payload of data to be transmitted to the terminating devices;

enable the terminating devices to decode the sender MCData user ID to identify the sender of the data;

define payload format changes to include the sender MCData user ID;

add the sender MCData user ID in a short data service (SDS) signaling payload message content;

add the sender MCData user ID in an SDS notification message content;

add the sender MCData user ID in a File Distribution (FD) signaling payload message content; and add the sender MCData user ID in a FD notification message content.

The embodiments disclosed herein can be implemented through at least one software program running on at least one hardware device and performing network management functions to control the elements. The elements shown in FIGS. 2 to 5 can be at least one of a hardware device, or a combination of hardware device and software module.

The embodiments disclosed herein describe methods and systems for managing Mission Critical Data (MCData) sessions. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an application-specific integrated circuit (ASIC), or a combination of hardware and software means, e.g. an ASIC and a field programmable gate array (FPGA), or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for managing a mission critical data (MC-Data) session, the method comprising:

triggering, by a sender user equipment (UE), transmission of short data service (SDS) group data to at least one receiver UE;

adding, by the sender UE, a sender MCData user identifier (ID) and an extended application ID as an additional information element (IE) in a signaling payload of the SDS group data in an SDS signaling payload message; and transmitting, by the sender UE, the sender MCData user ID and the extended application ID included as the additional IE in the signaling payload of the SDS group data in the SDS signaling payload message to the at least one receiver UE, wherein the SDS signaling payload message includes the IE corresponding to the sender MCData user ID and one or more IEs corresponding to the data, and wherein the IE corresponding to the sender MCData user ID is associated with at least one of an information element index (IEI) field indicating a value of the sender user MCData ID, a type field indicating a type of the sender MCData user ID, a presence field, a format field indicating a format of the sender MCData user ID, and a length field indicating a length of the sender MCData user ID.

2. The method of claim 1, wherein the sender UE is an initiator of the MCData session.

3. The method of claim 1, wherein the sender UE is not an initiator of the MCData session.

4. The method of claim 1, wherein the SDS signaling payload message includes at least one of a content, a file, audio, a video, an image, and text.

5. The method of claim 4, wherein the SDS group data transmitted by the sender UE to the at least one receiver UE includes a notification sent by the at least one receiver UE as an acknowledgement in response to the SDS signaling payload message received from the sender UE.

6. The method of claim 1, wherein the sender MCData user ID is an MCData user ID.

7. A sender user equipment (UE) in a mission critical data (MCData) communication system, the UE comprising:

a transceiver; and a controller coupled to the transceiver and configured to:

trigger transmission of short data service (SDS) group data to at least one receiver UE, add a sender MCData user identifier (ID) and an extended application ID as an additional information element (IE) in a signaling payload of the SDS group data in an SDS signaling payload message, and transmit the data with the sender MCData user ID and the extended application ID included as the additional IE in the signaling payload of the SDS group data in the SDS signaling payload message to the at least one receiver UE, wherein the receiver UE is configured to decode the sender MCData user ID by:

decoding an Information Element (IE) corresponding to the sender MCData user ID and associated with at least one of an Information Element Index (IEI) field, a type field, a presence field, a format field, and a length field present in the signaling payload of the received data in sequence to identify the sender UE.

* * * * *